United States Patent [19]

Bench et al.

[11] 4,312,064
[45] Jan. 19, 1982

[54] MODIFIED VESTIGIAL SIDE BAND TRANSMISSION SYSTEM

[75] Inventors: Stephen M. Bench, Huntington Beach; Paul H. Thibodeau, Stanton; Guy M. Campbell, Corona; Theodore M. Stump, Costa Mesa, all of Calif.

[73] Assignee: The Anaconda Company, Denver, Colo.

[21] Appl. No.: 115,378

[22] Filed: Jan. 25, 1980

Related U.S. Application Data

[63] Continuation-in-part of Ser. No. 7,666, Jan. 29, 1979, abandoned.

[51] Int. Cl.³ .......................... H04J 1/06; H04J 1/12; H04J 1/18
[52] U.S. Cl. ...................................... 370/71; 370/72; 455/204
[58] Field of Search .................. 370/71, 69, 72, 75; 455/203, 204; 333/110, 175

[56] References Cited

U.S. PATENT DOCUMENTS

| | | | |
|---|---|---|---|
| 2,181,499 | 11/1939 | Wheeler | 333/175 |
| 2,247,898 | 7/1941 | Wheeler | 333/175 |
| 2,717,956 | 9/1955 | Egun | 455/204 |
| 3,466,548 | 9/1969 | Roy | 455/204 |
| 3,794,938 | 2/1974 | Boelter | 333/168 |
| 4,029,902 | 6/1977 | Bell | 370/69 |
| 4,130,733 | 12/1978 | Ashford | 370/69 |
| 4,159,454 | 6/1979 | Willmore | 333/110 |

Primary Examiner—David L. Stewart
Attorney, Agent, or Firm—Knobbe, Martens, Olson, Hubbard & Bear

[57] ABSTRACT

A communication transmission system includes one or more modulated carrier communication channels in which a receiver has a modified vestigial side band filter for eliminating phase cancellation. Accurate design of the modified vestigial side band filters at the receivers, further reduces susceptibility to frequency drift caused by component aging and component response to environmental changes. The system has particular utility in multiple channel carrier telephone communication systems which utilize limited available band width for providing a maximum number of communication channels over an extended length communication line.

41 Claims, 9 Drawing Figures

MODIFIED VESTIGIAL SIDE BAND TRANSMISSION SYSTEM

RELATED APPLICATION

This is a continuation-in-part application Ser. No. 007,666, filed Jan. 29, 1979, entitled Vestigal Filter And Use at Receiver in AM Transmission System now abandoned.

BACKGROUND OF THE INVENTION

Multiple channel analog frequency division multiplexing for use in communicating multiple simultaneous information channels is well known in the art.

The two most common modes of carrier modulation used in such systems are amplitude modulation and frequency modulation. Normal amplitude modulation is double side band, which results in the creation of two identical side bands, frequency displaced on each side of the carrier frequency by an amount identical to the modulating frequency. The strength of the side bands, in such a system, is directly proportional to the amplitude of the modulating frequency. While double side band amplitude modulation is simple and inexpensive to implement, it also inherently generates certain disadvantages. The transmission occupies twice the band width of the highest modulating frequency, has no particular signal to noise advantage, as is exhibited in more complex transmission systems, and is subject to phase errors between the two side bands. Such modulation presents particular problems if the communication medium exhibits non-uniform phase characteristics at varying frequencies within the channel band width.

Frequency modulation for carrier multiplexed systems requires more complex and expensive equipment, and increases the signal-to-noise ratio only at the cost of wider occupied band width.

Amplitude modulation is often modified to provide single side band transmission to reduce the required band width for transmission, and involves the suppression of the carrier and one side band at the transmission point. The signal-to-noise ratio can be made correspondingly higher. However, the equipment is much more complex than with standard amplitude modulation, particularly because the carrier must be reinjected at the receiver.

Some of the complexity of single side band reception can be eliminated by transmitting both a single side band and the carrier, while suppressing the remaining side band. Such transmission, however, suffers high distortion in an environment where the carrier frequency at the receiver is subject to drift. In addition, such transmission requires an extremely accurate and costly transmission filter.

True vestigial side band transmission systems slightly attenuate the carrier frequency in comparison with a main side band, and substantially attenuate the remaining (vestigial) side band. Such systems allow some band width economy in transmission, and are used, for example, to transmit picture information for television broadcast. True vestigial side band systems, however, suffer from high amplitude distortion if the receiver tuner drifts so that the carrier frequency is not accurately placed within the receiver pass band. Furthermore, the detected signal suffers from high harmonic distortion at high modulation indices.

Single side band, single side band plus carrier, and true vestigial side band transmission have classically been utilized in transmission systems to reduce the amount of band width required for transmission, so that more communication channels may occupy the same transmission band width, while the disadvantages of these modulating techniques have been reduced or eliminated through the use of expensive, complex equipment.

However, in systems where equipment cost and complexity are of significant concern, it has been typical, in the prior art, to utilize double side band amplitude modulation and to limit overall system performance to a level consistent with this modulation. These limitations are a primary design consideration, for example, in multiple channel, carrier multiplexed telephone systems operating over extended wire pairs. Such transmission systems exhibit attenuation which increases with increasing frequency, such that higher frequency transmission necessitates either higher amplitude transmission or more complex repeaters placed at more frequent intervals. The use of frequent repeater amplifiers is costly, while the use of higher signal levels requires the transmission of greater power levels which, in turn, increases the cost and losses of the system. Thus, such communication systems are essentially bandwidth limited. In addition, these systems exhibit non-linear transmission medium phase characteristics at certain carrier channels as a consequence of the use of repeater amplifiers and extremely long cable runs, so that the effective usable band width and range of the systems must be compromised with one another to form a viable transmission network at reasonable cost.

SUMMARY OF THE INVENTION

The present invention utilizes a modified vestigial receiver in a carrier multiplexed transmission system with standard double, side band AM transmitters. This does not result in a band width reduction for individual channels, but does permit channels to exist at frequencies within the pass band of the system which might otherwise be unusable. Thus, the system permits a greater number of channels to be transmitted, without increasing overall system band width, and without substantially increasing system cost or complexity. At the same time, the invention substantially reduces distortion inherent in double side band modulating systems which results from phase non-linearities in the transmission medium. In addition, the invention reduces the susceptibility of the system to distortion caused by frequency drift from component aging or environmental factors.

The system transmitters produce double side band AM signals. On selected channels, a receiver is utilized which attenuates the received carrier frequency by a smaller degree than is common with true vestigial side band transmission, but which maintains a gentle receiver filter attenuation slope at the carrier frequency. This moderate slope reduces the susceptibility of the receiver to distortion caused by frequency drift of the receiver relative to the transmitted carrier signal. Although the resulting frequency response of the receiver within its pass band is not flat, as is common in true vestigial transmissions, a post detector filter flattens the response. In fact, the use of the post detector filter in this manner actually permits greater attenuation of harmonic distortion than would otherwise be possible. This transmission technique provides double side band transmission of all modulating frequencies, and reception of low modulating frequencies in a double side band mode, while essentially single side band reception is utilized for high modulating frequencies. Because phase non-linearities in transmission media, including repeater filters, are more acute at higher carrier modulating frequencies, and at filter band edges, this system greatly reduces distortion caused by these factors.

Thus, the present invention permits the utilization of modified vestigial reception to eliminate distortion caused by phase non-linearities, while at the same time reducing the susceptibility of true vestigial transmission systems to receiver frequency drift.

Because, in certain multiple channel transmission systems, range limiting phase non-linearities exist only on some of the multiple channels, the present invention contemplates the use of the receiver filtering technique, referred to above as modified vestigial side band reception, only on certain channels, with standard AM transmission on all channels and standard AM reception on the remaining channels.

DESCRIPTION OF THE DRAWINGS

These, and other advantages, of the present invention are best understood through the following detailed description, which references the drawings, in which.

DETAILED DESCRIPTION OF THE PREFERRED EMBODIMENT

The preferred embodiment of this invention is incorporated in a frequency division multiplexed, analog carrier system for use, for example, in multiplexing multiple subscriber telephone lines on one telephone cable pair, where the subscriber stations are located at a substantial distance from the central office. Systems of this type are used to expand service where existing cables have previously limited the number of available subscriber stations or where, because of the length of the transmission cables, economic considerations justify the use of modulating electronics in preference to the installation of additional cable pairs over long cable runs. As is well known, the attenuation of such a cable pair increases with increasing frequency, and it is therefore common to modulate relatively low frequencies with the voice signal in order to limit cost by limiting the number of repeaters and the transmission power level required in the system.

Figure 1:
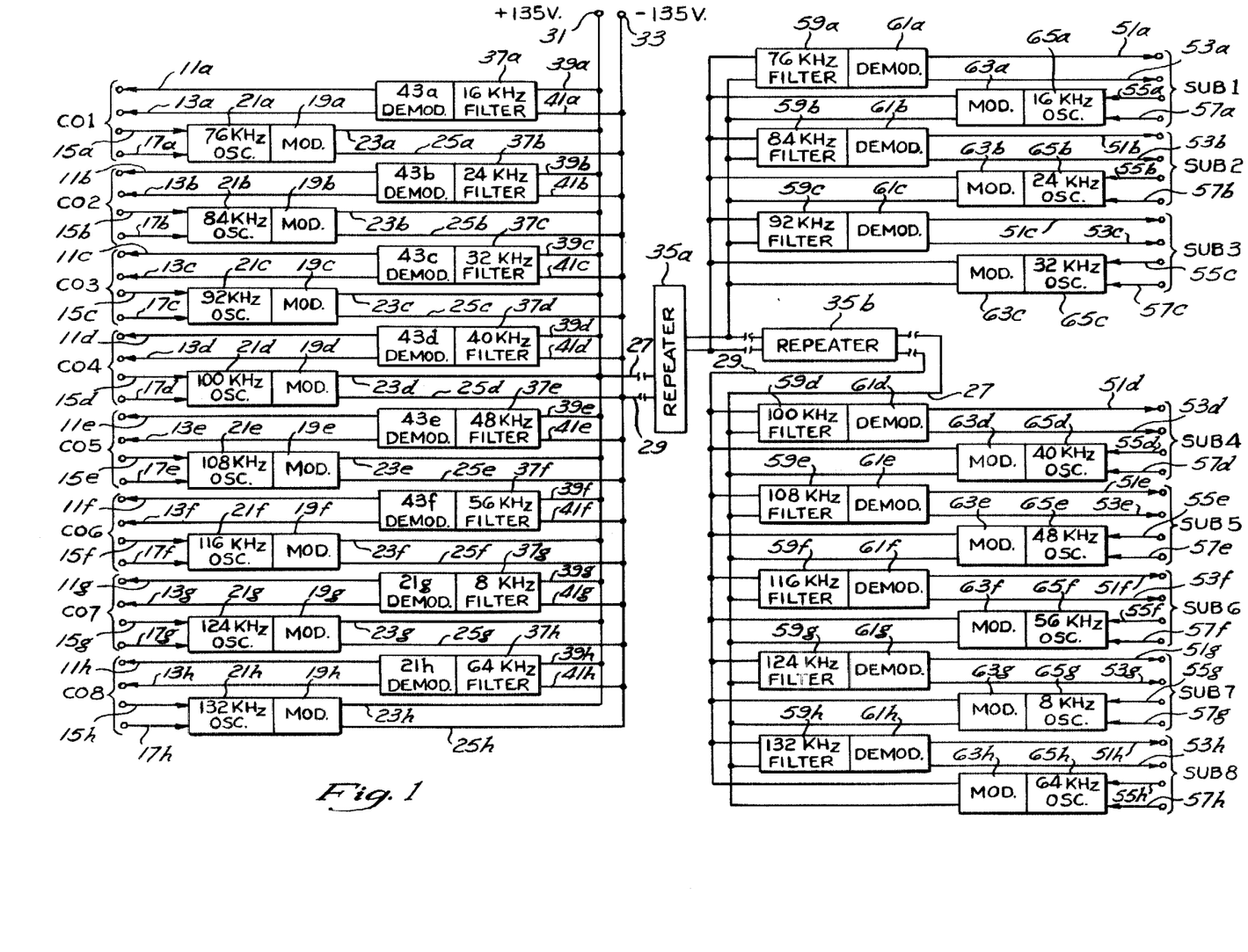
FIG. 1 is a block diagram schematic of the multiple channel modulated carrier transmission system of the present invention.

FIG. 1 shows a station carrier system which, by AM carrier modulation, permits the multiplexing of eight subscriber channels, each permitting two-way communication, on one cable pair. In this instance, the cable pair carries 16 carrier frequencies, 8 of which are used for transmitting voice signals from the central office to subscribers, and 8 used for transmitting voice signals from the subscribers to the central office. In the figure, the eight communication channels at the central office are designated CO1 through CO8, each including a voice output channel on lines 11a through 11h and 13a through 13h and a voice input channel on lines 15a through 15h and 17a through 17h. As is well known, the output channel and input channel at each station are combined in a four wire to two wire converter (not shown).

Each of the voice input channels on lines 15a–15h and 17a–17h are combined in a modulator 19a–19h with a carrier signal provided by a carrier oscillator 21a–21h to provide a standard, double side band AM modulated signal at the output of the modulators 19a–19h on lines 23a–23h and 25a–25h.

These output lines 23a–23h, 25a–25h are summed in a summing amplifier and connected to a transmission cable pair 27,29. The summing amplifier is not shown, but is well known in the art. In addition, the cable pair 27,29 is connected to a pair of regulated DC voltage sources 31 and 33, respectively, supplied at the central office. The DC power from the sources 31,33 is coupled through plural repeaters 35a and 35b (to be described below), so that this power can be utilized at remote subscriber stations to power the filters, modulators, demodulators, and oscillators, described below. This DC coupling along the cable pair 27,29 permits the operation of remote subscriber stations without supplemental power at these stations. It will be understood by those skilled in the art that, if the length of the cables 27,29 is extreme, such DC power is substantially attenuated by line losses, supplementary DC power may be supplied.

Each of the central office stations CO1 through CO8 additionally includes a filter 37a through 37h connected by a pair of lines 39a through 39h and 41a through 41h to the main cable pair 27,29 through a transformer. The use of such a transformer is well known, and is not shown. These filters 37a–h selectively filter incoming communication channels to provide a signal to plural demodulators 43a through 43h which provide the incoming voice signals on lines 11a–h and 13a–h.

The modulated carrier signals used for communication between the central office and subscriber channels are attenuated by the cable pair 27,29 and thus, for long cable runs, plural repeaters, such as the repeaters 35a and 35b, may be utilized in the system to amplify signals on lines 27,29 utilizing power supplied by the DC voltage sources 31 and 33 at various locations along the cable pair 27,29.

The subscriber stations may be located wherever required along the cable pair 27,29, typically at substantially remote distances from the central office. As an example, it is typical to utilize a repeater 35, approximately every five miles along the cable pair 27,29 to amplify the signals and thus avoid loss of the signals altogether due to cable attenuation. This amplification is accomplished utilizing the plus and minus 135-volt DC power on the cable pair 27,29 from the sources 31,33.

In the example shown in FIG. 1, plural subscriber stations SUB1 through SUB3 are connected in parallel to the line pair 27,29 at a location between the repeaters 35a and 35b. Additional subscriber stations SUB4 through SUB8 are located even more remote from the central office, beyond the repeater 35b.

In a configuration similar to that described for the central office communication channels CO1-CO8, each of the subscriber stations includes an incoming voice line pair 51a–h and 53a–h and outgoing voice line pair 55a–h and 57a–h. The incoming voice signals are provided by filtering the incoming modulated carrier signals on the cable pair 27,29 utilizing a filter 59a–h and, once a carrier and its side bands are thus selected, demodulating the voice signal, using a demodulator 61a–h. The outgoing voice channels on line pairs 55a–h, 57a–h are combined in modulators 63a–h with carrier frequency signals provided by plural oscillators 65a–h, in a manner identical to that utilized at the central office stations.

Figures 2A, 3:
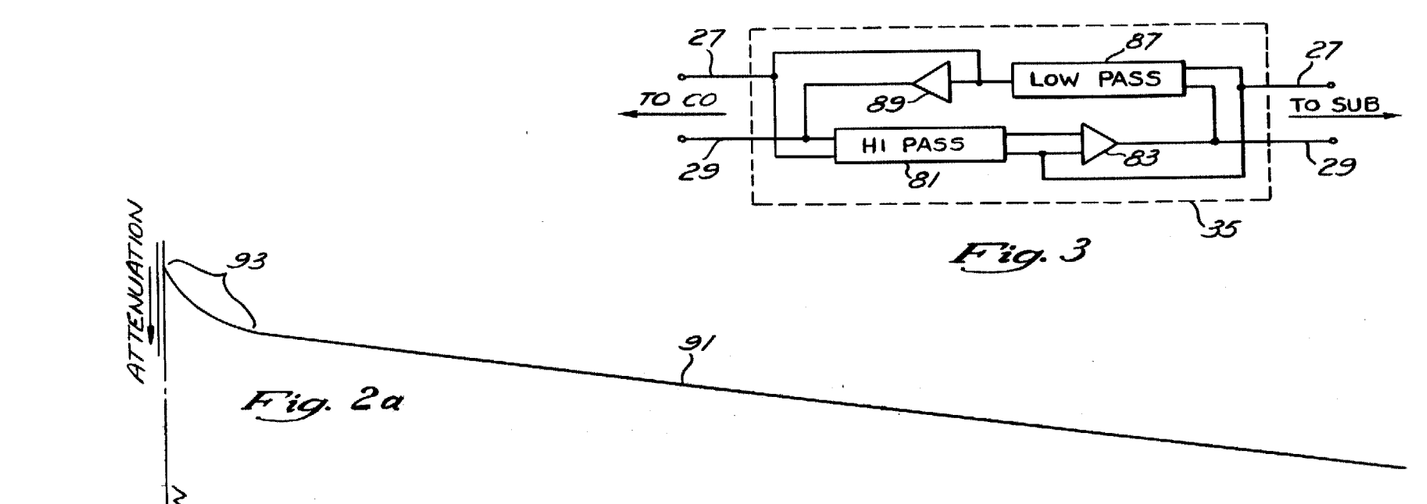
FIG. 2A is a plot of transmission line attenuation in the system of FIG. 1.
FIG. 3 is a schematic block diagram of the repeater of FIG. 1.
Figure 2B:
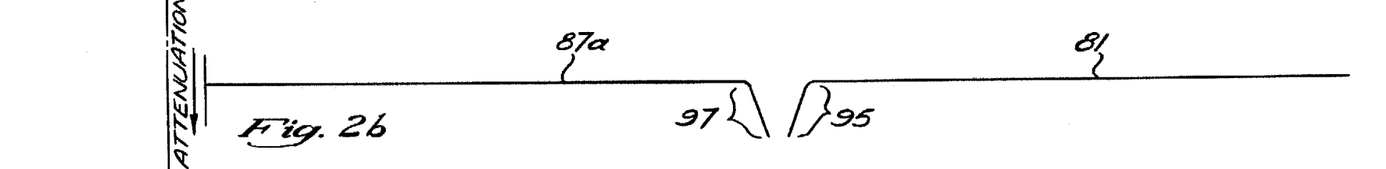
FIG. 2B is a plot of the attenuation characteristics of the repeater filters of FIGS. 1 and 3.
Figure 2C:
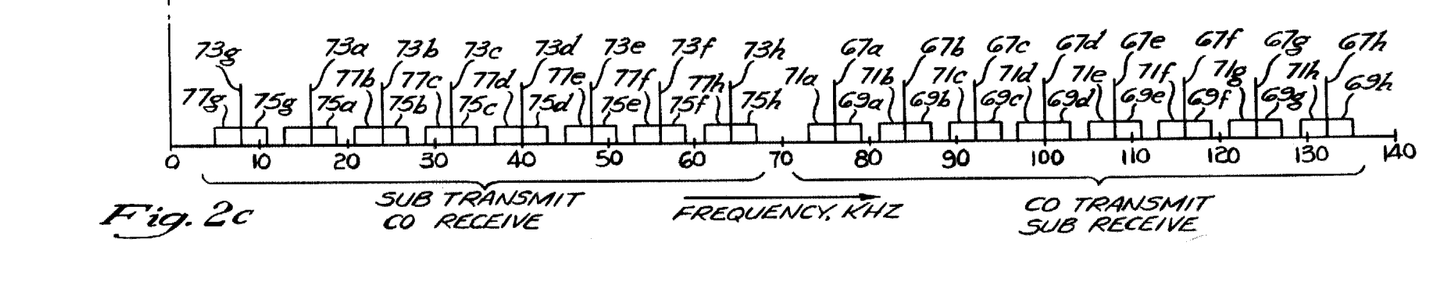
FIG. 2C is a frequency plot showing the location of the transmission channel of the system of FIG. 1 within the system pass band.

FIG. 2C provides a chart of the frequency spectrum utilized by the carrier system of FIG. 1. It will be noted that 16 different carrier frequencies are utilized for two-way communication between the 8 central office channels CO1-CO8 and their corresponding 8 subscriber station channels SUB1-SUB8. Thus, voice signals transmitted from central office communication channel CO1 modulate a 76 kilohertz carrier wave to provide the carrier signal 67a of FIG. 2C, upper side band 69a, and lower side band 71a. Incoming voice signals for this channel CO1 produced by subscriber station SUB1 are provided on carrier signal 73a, upper side band 75a, and lower side band 77a. It will be recognized, of course, that the diagram of FIG. 2C does not show the actual characteristics of the signal, but is only schematically representative of the carrier signals and their side bands to show the frequency locations thereof. The actual frequency content of the modulated signals will be described in detail below.

Utilizing the same alphabetic designation for each channel (a for CO1, SUB1; b for CO2, SUB2, etc.), the location of the remaining carrier frequencies and side bands are shown in FIG. 2C. In each case, the outgoing carrier signal from the central office channel CO1-CO8 is designated 67a–h and the incoming carrier signal to the central office channel CO1-CO8 is designated 73a–h, respectively. It can be seen that each of the voice channels is provided with 3 KHz modulation band width, providing a 6 KHz bandwidth, forced by a side band pair 69a–h, 71a–h; 75a–h, 77a–h surrounding the carriers 67a–h, 73a–h, respectively. The upper side band 69a–h, 75a–h of each carrier (69c, for example) is separated from the lower side band 71a–h, 77a–h (71d, for example) of the next adjacent carrier by a 2 KHz guard band.

All of the subscriber station transmit channels are provided at frequencies below 70 KHz, while all of the central office transmit channels are located at frequencies above 70 KHz, in order to permit satisfactory operation of the repeater amplifiers 53a and 53b in a manner described below.

It will be recognized that the modulators 19a–h, 63a–h may include appropriate output filters in order to frequency limit the side bands 69, 71, 75, 77 to 3 KHz and thus permit the guard bands, shown in FIG. 2C, to prohibit cross-talk between the communication channels. The filters 59a–h, 37a–h select the appropriate carriers 67a–h, 73a–h and their related side bands for selective demodulation by the demodulators 61a–h, 43a–h, respectively. Thus, each of the communication channels is separately carried on a distinct carrier frequency to provide channel separation in the system.

It will be recognized from the preceding description that the repeaters 35a and 35b, and other repeaters which may be added to the system to extend the cable pair 27,29, must be capable not only of communicating voice modulated carrier signals in both directions, but also of coupling the DC voltage from the sources 31,33 which is used to power all of the electronics outside of the central office location. An exemplary repeater 35 is shown in FIG. 3.

This repeater 35 includes a high pass filter 81 connected to the line pair 27,29 at the central office end of the repeater 35. This high pass filter 81 will pass only the carriers 67a–h and side bands 69a–h, 71a–h in the upper half of the frequency spectrum of FIG. 2C, that is, the central office transmit channels. These signals are amplified in an amplifier 83 and connected to the cable pair 27,29 at the subscriber station side of the repeater 35.

Similarly, a low pass filter 87 is connected at the cable pair 27,29 on the subscriber station end of the repeater 35 to pass the carriers 73a–h and associated side bands 75a–h and 77a–h to an amplifier 89, the output of which is connected to the cable pair 27,29 at the central office-side of the repeater 35. FIG. 2B shows the pass band characteristics 81a of the high pass filter 81 of FIG. 3 and the pass band characteristics 87a of the low pass filter 87 of FIG. 3. It will be seen from FIG. 2B that the filters 81 and 87 are mutually exclusive in their pass band frequency ranges so that, for example, the output signals from the amplifier 83 of FIG. 3 cannot be amplified in the amplifier 89. The frequency arrangement of FIG. 2 thus permits this bi-directional amplification in the repeaters 35 without interference between the channels in the two directions through the simple use of low and high pass filters 87,81, respectively.

The repeater 35 must be constructed to pass DC power voltage from the sources 31,33. This may be accomplished by making the amplifier 89 DC coupled, and assuming that the low pass filter 87 will pass DC signals. Alternatively, the repeaters 35 may include a parallel circuit filtered to carry DC signal levels but to reject AC signals at frequencies even well below the lowest frequencies within the lower side band 77g of FIG. 2C.

FIG. 2A shows the attenuation characteristics 91 of the cable pair 27,29 with frequency. Although the attenuation increases gradually with increasing frequency, the curve 91 is fairly uniform above approximately 13 KHz. Below 13 KHz, in the range designated generally 93 in FIG. 2A, relatively drastic slope changes occur in the characteristic curve 91. These slope changes in the region 93, along with the effects of the pass band characteristics 81a and 87a of the repeaters 35, shown in FIG. 2B, particularly in the regions 95 and 97 (the roll-off portion of the filters 81,87) generate certain problems in the transmission of modulated carrier signals in the system of FIG. 1. While the use of more overall band width could alleviate these problems, permitting the lowest frequency carrier 73g to be placed at a higher frequency and increasing the guard band around 70 KHz to move the side bands 75h and 71a further away from the roll-off characteristics of the filters 81 and 87, this solution is not entirely practical. Initially, this solution would require higher frequencies to be utilized. That is, the carrier 67h and its side bands would have to be increased in frequency, increasing the attenuation over long cable lengths and requiring additional repeaters 35, or more sensitive amplifiers with more complex filtering, within the system. In addition, the standards which govern carrier multiplexed telephone communications require that the outgoing and incoming signals to be separated at approximately 70 KHz. In addition, the problem described above can be alleviated by reducing the number of channels, but only at the expense of higher cost per channel transmitted.

Thus, the present invention, utilizing modified vestigial band pass reception, is designed to permit high quality voice transmission in two directions on 8 channels within these constraints and without unnecessarily increasing the complexity of repeaters 35 utilized in the system. As a result, the cost of the overall system is reduced to the greatest extent possible. In this regard, it should be recognized that, although single side band transmission permits a closer spacing of the carrier frequencies 67 and 73, such transmission substantially increases both the complexity and cost of the transmission and receiving electronics. In contrast, the present invention utilizes relatively inexpensive double side band AM modulated transmission equipment and provides a novel solution for alleviating distortion in channels a, g, and h caused by non-linear cable attenuation in the region 93 of FIG. 2A and non-linear characteristics in the regions 95 and 97 of FIG. 2B. The integrity of all system channels is therefore maintained while the cost of the system is kept at a moderate level.

The drastic slope changes in the region 93 of FIG. 2A introduce, as is well known in the art, phase non-linearities in this same region. These phase non-linearities over extended lengths of the cable pair 27,29 can result in a phase reversal between the lower side band 77g and upper side band 73g. At higher modulation frequencies, this phase reversal can cause cancellation of the upper and lower side band signal portions, and resulting distortion, attenuation, and possible loss of higher frequency modulation signals.

In order to make the guard band around 70 KHz as narrow as possible in order to permit more modulated carrier channels to be utilized, the roll-off of the filters 81 and 87 of FIG. 3 must be made extremely sharp. Thus, high order filters are used which produce, as an undesirable by-product, substantial phase non-linearities in the filtered signal at the band edges. Because the roll-off, as can be seen in FIG. 2B, occurs primarily in the area of the side bands 71a and 75h, there can be a phase reversal, particularly at the higher modulation frequencies, leading to distortion and cancellation in channels a and h. Thus, the lower side band modulation at high modulation frequencies can be shifted so that it is 180 degrees out of phase with the upper side band at the same frequency, leading to cancellation of the modulation signal.

As indicated previously, the equipment required to transmit single side band or true vestigial side band signals is complex and expensive. Thus, it is advantageous in this system to transmit double side band AM signals. In order to alleviate the phase cancellation and distortion problems, which exist at the low frequency end of the transmission spectrum, and in the area close to the guard band between subscriber station transmit channels and central office transmit channels due to the repeater band splitting filters, one solution would be to use single side band reception equipment to receive the double side band AM modulated signal. While this solution eliminates a possibility of side band cancellation with phase shift, and thus provides a satisfactory solution, it introduces problems of its own.

Figure 4:
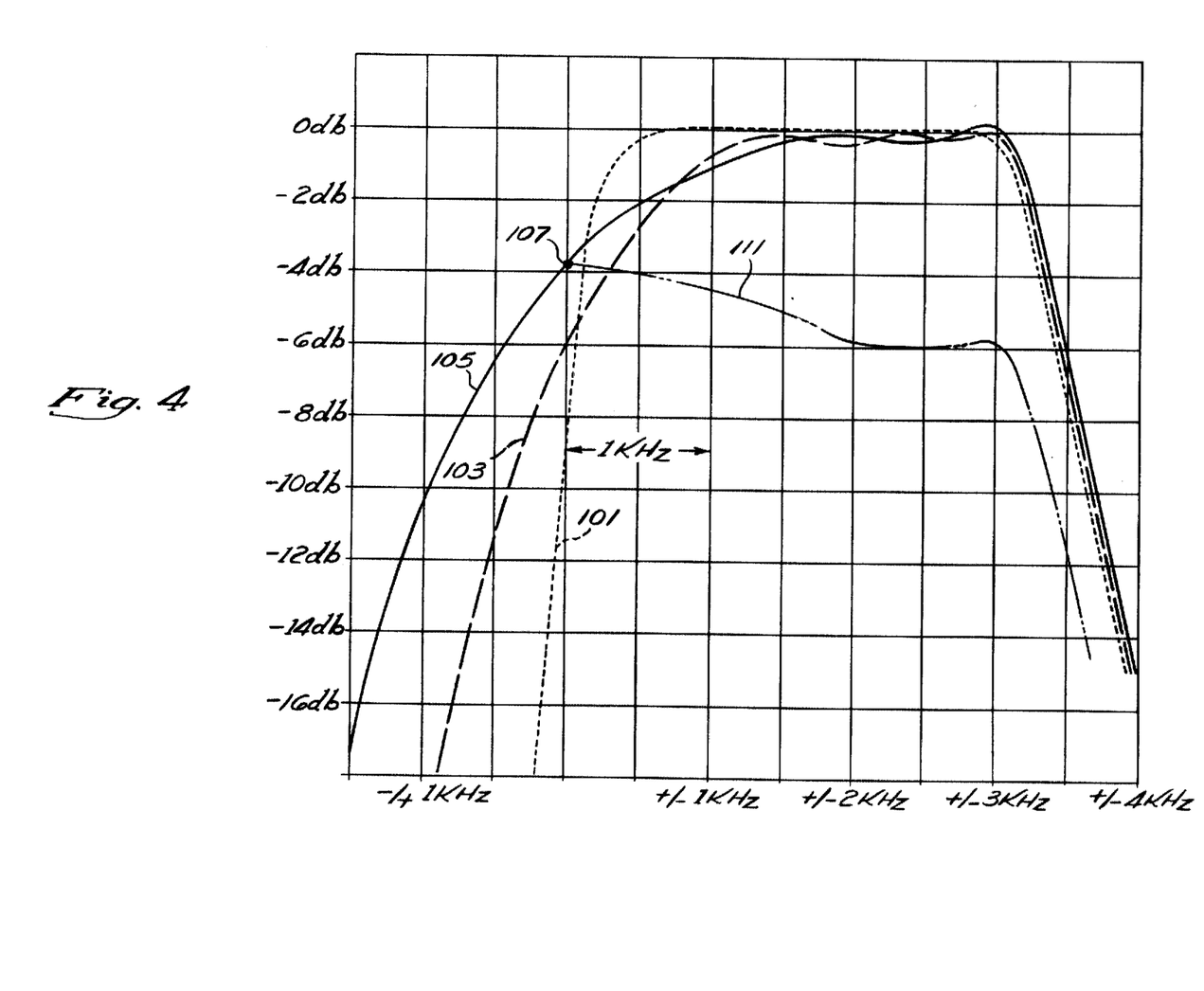
FIG. 4 provides a plot of attenuation characteristics of receiver filters within the system of FIG. 1, as well as certain prior art receiver filter characteristics for comparison.

Referring to FIG. 4, there is shown a plot 101 of a theoretical single band receiver filter response curve. Particular note should be taken of the fact that, in FIG. 4, the frequencies offset from the carrier frequency are shown as $+/-$ on the right side of the chart and $-/+$ on the left side of the chart. Thus, the chart, as shown, provides, in the case of the single side band filter 101, reception of the upper side band alone and corresponds directly to the higher frequencies being on the right side of the chart. If the higher frequencies are on the left side of the chart, then the plot 101 is a representation of a single side band reception filter receiving only the lower side band.

As mentioned previously, the theoretical single side band filter, having an attenuation curve as plotted at 101, will pass substantially all of one side band up to approximately carrier frequency plus 3 KHz. Such a filter is a compromise, since it is desired to attenuate the carrier frequency to the greatest extent possible, while at the same time, permitting the low frequency modulation signals to pass through the filter to the greatest extent possible. Thus, the plot 101 has a very steep roll-off through the carrier frequency. It will be appreciated that, if this filter is utilized at central office station CO7 (FIG. 1), to receive only the upper side band 75g, for example, of the 8-kilohertz carrier 73g, and is used, in addition, at the central office station CO8 to pass only the lower side band 77h of the 64-kilohertz carrier frequency signal 73h; and, finally, at subscriber station SUB1, to pass only the upper side band 69a of the 76-kilohertz carrier frequency signal 67a, phase cancellation problems within the system, described in reference to FIGS. 1 and 2, will be eliminated. Thus, at certain receiver stations, one side band of the signal is substantially entirely removed at the receiver filter. Phase cancellation, due to side band phase reversal, caused by the repeaters 35 and attenuation of the cable pair 27,29, cannot occur.

However, due to the extremely fast roll-off of the filter curve 101 at the carrier frequencies, frequency drift of the filters 59a, 37h, or 37g, in such an implementation, will introduce substantial signal distortion. Thus, referring to FIG. 4, a shift in the center frequency of the filter of only 100 cycles will result in approximately 4 db signal level change at the carrier frequency and at low modulation frequencies. Center frequency drift, due to aging and environmental reponse of components within the filters, thus provides undesirable distortion due to drift in the filter frequency.

Phase cancellation problems may also be cured with a true vestigial filter having a response curve shown at 103 in FIG. 4, utilized in the same locations as suggested above for the single side band filter, that is, filters 59a, 37h, and 37g. A true vestigial filter, as shown by the plot 103, will attenuate the carrier frequency by 6 db, while passing virtually all of one side band and only a vestige of the remaining side band. Those signals provided by the vestige side band, at the low modulation frequencies, supplement the attenuated signals of the passed side band to provide virtually flat response. This system, however, suffers from problems similar to those described in reference to a single side band receiver, in that the slope of the filter curve 103 at the carrier frequency is still extremely steep. Thus, if the carrier frequency of the filter drifts slightly, due to aging or environmental causes, significant distortion, particularly at low modulation frequencies, will be introduced.

It should be understood that, in accordance with the present invention, either the single side band filter, shown as plot 101 of FIG. 4, or true vestigial side band filter, as shown by the plot 103, may be used for filters 59a, 37h, and 37g in the system of FIG. 1, the remaining filters of FIG. 1 being double side band filters. This solution to the phase cancellation problem will, however, introduce the distortion problem described above, and is thus usable only in systems where temperature and aging drift of filter components can be kept to a minimum. It will be understood that the single side band filter plot 101 and vestigial side band filter plot 103 are provided by filters which are well known in the art and which may be used at the locations within the circuit of FIG. 1, described above, to eliminate phase cancellation problems, without other substantial modification to the AM carrier modulated system.

FIG. 4 also includes a plot 105 of a novel modified vestigial side band filter which not only solves the phase cancellation problems, discussed above, but at the same time reduces the susceptibility of the system to environmental and aging drift. Thus, carrier multiplexing systems employing a filter which provides plot 105 have significant advantages. This filter will be described in detail below. The plot 105 does not produce a flat pass band response, a matter which will be dealt with in the description below, but does provide a relatively gentle slope at the point 107 where the curve passes through the carrier frequency. Because of this gentle slop characteristic at the carrier frequency, distortion caused by frequency drift of the filter, or of the carrier frequency itself, are minimized.

A larger portion of the signal information is carried by the reduced side band than with either true vestigial side band 103 or single side band reception 101. As in the case of the description above, with reference to single side band and true vestigial filtering, it will be understood that the system of FIG. 1 utilizing the modified vestigial side band characteristic 105, provides double side band modulation from all modulators, but attenuates the incoming signal at the subscriber station SUB1 and central office stations CO7 and CO8, utilizing a filter having an attenuation characteristic 105.

In the case of filters 37g and 59a, the lower side band 77g,71a is attenuated, so that the filter plot 105 is as shown in FIG. 4. In the case of filter 37h, however, the plot 105 is reversed, the lower side band 77h providing the main received side band, and the upper side band 75h providing the attenuated side band for reception.

Plot 111 of FIG. 4 shows the effective modulation signal pass band for a receiver filter having the attenuation characteristics of plot 105. It will be noted that the pass band does not provide a flat response, but rather is attenuated at the higher modulation frequencies, particularly between 2 kilohertz and 3 kilohertz. While this might appear to provide a disadvantage of the modified vestigial band pass filter utilized in the present invention, it actually can be utilized in an overall circuit to provide an advantage, as described in more detail below. A review of the plots 105 and 111 shows that this modified vestigial band pass receiver filter provides essentially AM double side band reception between approximately 0 and 1.5 kilohertz, and essentially single side band reception between approximately 1.5 kilohertz and 3 kilohertz modulation frequencies. Since phase cancellation problems exist primarily at higher modulation frequencies, this filter thus eliminates such phase cancellation, while at the same time providing the gentle slope characteristic described above at the carrier frequency.

Figure 6:
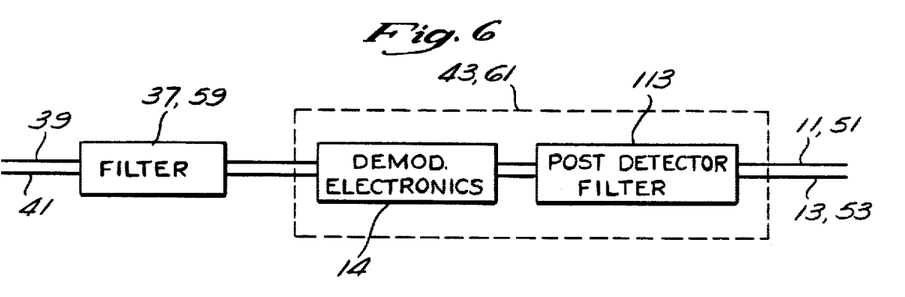
FIG. 6 shows a schematic block diagram of a post detector filter which may be utilized to reduce harmonic distortion and flatten system pass band response.
Figure 7:
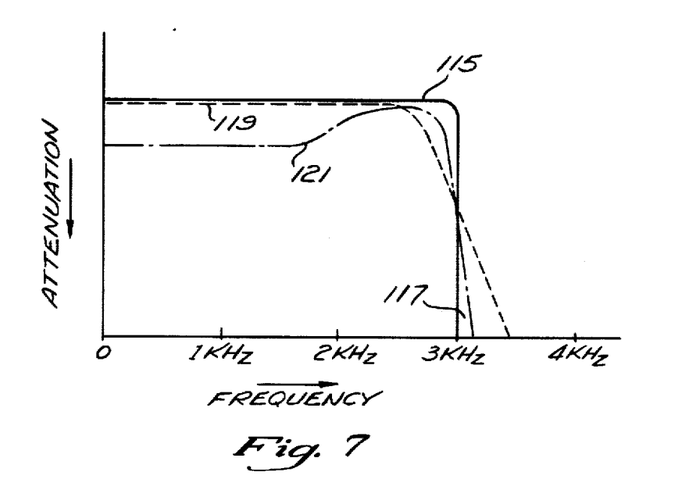
FIG. 7 is a plot of the attenuation characteristics of the post detector filter of FIG. 6 along with comparison attenuation plots.

Because single side band reception occurs only above approximately 1.5 KHz, and because distortion resulting from such single side band reception is likely to result in harmonic distortion, the lowest frequency distortion to be expected will be the first harmonic of approximately 2 KHz modulation signals, or at 4 KHz. Referring to FIG. 6, the present invention utilizes a post detector filter 113 at the output of the demodulator electronics 114 in each demodulator 43, 61, utilizing modified vestigial side band filtering at the filter 37,59. As described above, the circuit of FIG. 6 is utilized in the system of FIG. 1 for the demodulators 61a, 43h, and 43g. FIG. 7 provides a plot 115 of the theoretical pass band characteristic for the post detector filter 113. This filter 113 has an essentially flat pass band from 0 to 3 kilohertz, and a very sharp roll-off 117 at 3 kilohertz. Unfortunately, such a theoretical filter is virtually impossible to build, and most such filters have an attenuation characteristic shown by the plot 119, where the roll-off at 3 kilohertz is more gentle. As is well recognized in the filter design art, in order to make the post detector filter 113 more closely approximate the theoretical curve 117, it is necessary to introduce non-linearities in the pass band, resulting in a filter which provides a pass band attenuation pattern, as shown in plot 121, this pass band attenuating low modulation frequencies to a greater extent than those modulation frequencies between 1.5 and 3 kilohertz. This pass band characteristic 121, for the post detector filter 113, offsets the non-linearity in the pass band characteristic of the plot 111 of FIG. 5 for the vestigial filter 37,59, resulting in a relatively flat output pass band characteristic. Thus, what appears to be a disadvantage in the vestigial filter characteristic plotted in FIG. 4 at 111, actually results in the ability to provide a more discriminating post detector filter 113.

The use of the sharper post detector filter 113 plotted at 121 permits virtual elimination of harmonic distortion from the received voice channels.

Figure 5:
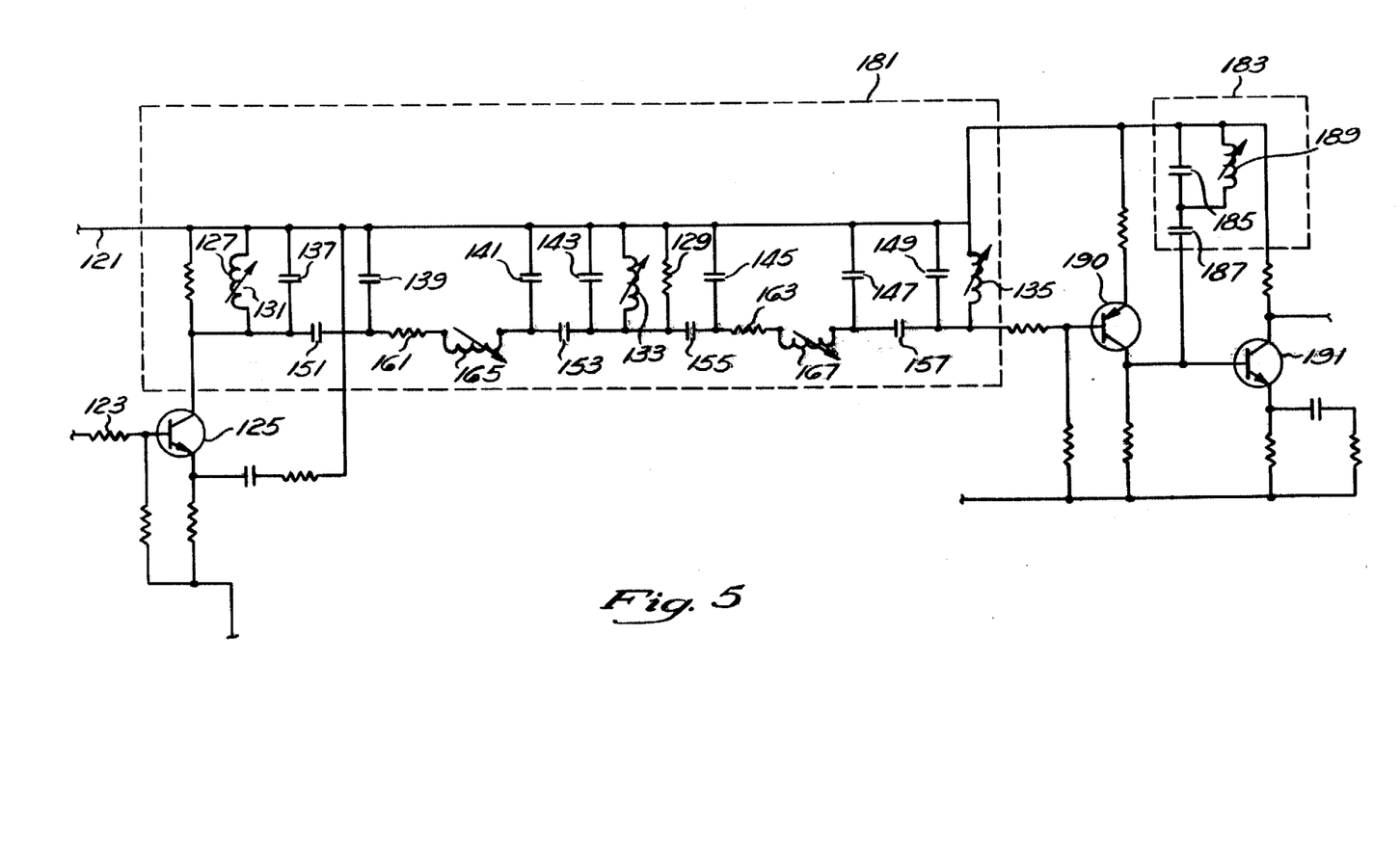
FIG. 5 is a schematic diagram of a filter which may be used in the system of FIG. 1 to achieve the filter characteristics of FIG. 4 at selected channels within the system of FIG. 1.

FIG. 5 shows a circuit diagram of the filter used in FIG. 1 for filters 37a through 37h and 59a through 59h. For channels 59b through 59h and 37a through 37f, the components of this filter are selected to provide band pass filtering of +/− 3 kilohertz around the received carrier, to generate double side band AM reception. For filters 59a and 37g and h, however, as described above, the filter elements are selected to provide modified vestigial band pass characteristic in accordance with plot 105 of FIG. 5. It has also been found convenient to provide modified vestigial band pass characteristics, utilizing the lower side band 77f as the main side band and the upper side band 75f as the modified vestigial side band, for the filter 37f at central office channel CO6 for compatibility with prior systems.

In FIG. 6, the carrier signal is input at lines 121 and 123 and amplified in transistor 125. The filter includes shunt resistance elements 127 and 129, shunt variable inductance elements 131, 133. and 135, and shunt capacitors 137, 139, 141, 143, 145, 147, and 149. In addition, series capacitors 151, 153, 155, and 157, along with series resistor 161 and 163, as well as series variable inductors 165 and 167 are provided. It will be understood that FIG. 5 shows an exemplary design for the filters in the various channels of the circuit of FIG. 1, but that those skilled in the art can provide the modified vestigial filtering of the present invention for any selected carrier frequency if they are provided with the information from the plot 105 of FIG. 4. The elements described above provide a band pass filter 181 which is appropriately tuned for filters 37f, 37h, and 59a to provide the band pass response of plot 105 of FIG. 4. In addition, for the filter 37g, a notch filter 183 may be combined with the band pass filter 181 to provide the modified vestigial response of plot 105. This filter 183 includes capacitors 185 and 187 and variable inductance 189. Additional amplification is provided in the circuit by transistors 189 and 191.

The following chart shows the values of the elements in the filters 181 and 183 for each of the filters 37a through 37h of FIG. 1 in this exemplary embodiment. From this information, the values for the remaining filters 59a through 59h are current.

contemplated provides a multiple frequency modulated carrier system in which modified vestigial side band filters are utilized at the receiving stations for those channels which exhibit phase cancellation problems due to the filter characteristic of the repeater 35 or due to line attenuation of the cable pair 27,29. In this system, all of the modulators 19 and 63 provide double side band AM modulated output signals so that the vestigial characteristics of the receiver filters 37,59 are utilized, not to closely space the carriers 67,73, but rather to avoid phase cancellation problems on certain channels. The implementation of the modified vestigial reception characteristics 105 of FIG. 4 is well within the skill of filter designers at any carrier frequency, the detuning of band pass filter poles and use of a notch filter in combination with a band pass filter provided as one possible implementation only.

We claim:

1. A telephone transmission system providing multiple modulated carrier communication channels between a single central station and plural remote stations on a single transmission medium which exhibits phase non-

| PART | # | Filter 37a | Filter 37b | Filter 37c | Filter 37d | Filter 37e | Filter 37f | Filter 37g | Filter 37h |
|---|---|---|---|---|---|---|---|---|---|
| RESISTOR | 127 | 4.53K | 9.76K | 5.23K | 9.09K | 10.7K | 60.4K | 11.3K | 7.5K |
| " | 129 | NOT USED | 1 Meg | 1 Meg | 1 Meg | 1 Meg | 1 Meg | NOT USED | NOT USED |
| " | 161 | 10 | JUMPR | JUMPR | JUMPR | JUMPR | JUMPR | 115 | JUMPR |
| " | 163 | JUMPR | JUMPR | JUMPR | JUMPR | JUMPR | JUMPR | JUMPR | 56.2 |
| INDUCTOR | 131 | 15 | 15 | 4 | 4 | 4 | 1.277 | 122 | 1.277 |
| " | 133 | 15 | 15 | 4 | 4 | 4 | 1.27 | 122 | 1.27 |
| " | 135 | 15 | 15 | 4 | 4 | 4 | 1.27 | 122 | 1.27 |
| " | 165 | 15 | 15 | 4 | 4 | 4 | 1.27 | 122 | 1.27 |
| " | 167 | 15 | 15 | 4 | 4 | 4 | 1.27 | 122 | 1.27 |
| " | 189 | NOT USED | NOT USED | NOT USED | NOT USED | NOT USED | NOT USED | 122 | NOT USED |
| CAPACITOR | 137 | 4101 | 2060 | 4657 | 3152 | 2293 | 5350 | 1560 | 4320 |
| " | 139 | 10,000 | 4840 | 10,637 | 7,013 | 4,972 | 11,300 | 3,421 | 9,100 |
| " | 141 | 10,770 | 5061 | 11,000 | 7310 | 5147 | 11,300 | 4101 | 9100 |
| " | 143 | 2164 | 1501 | 3759 | 2698 | 2024 | 4972 | 288 | 4101 |
| " | 145 | 10,770 | 5061 | 11,000 | 7310 | 5147 | 11,300 | 4101 | 9100 |
| " | 147 | 10,000 | 4840 | 10,637 | 7013 | 4972 | 16,900 | 3421 | 8760 |
| " | 149 | 4126 | 2060 | 4657 | 3187 | 2293 | NOT USED | 1560 | 4191 |
| " | 151 | 4010 | 1177 | 1746 | 880 | 541 | 804 | 2799 | 541 |
| " | 153 | 3137 | 860 | 1350 | 680 | 400 | 600 | 2149 | 427 |
| " | 155 | 3137 | 880 | 1350 | 680 | 400 | 600 | 2164 | 389 |
| " | 157 | 3981 | 1177 | 1746 | 880 | 541 | JMPR | 2756 | 680 |
| " | 185 | NOT USED | NOT USED | NOT USED | NOT USED | NOT USED | NOT USED | 1942 | NOT USED |
| " | 187 | NOT USED | NOT USED | NOT USED | NOT USED | NOT USED | NOT USED | 3812 | NOT USED |

Resistors in ohms
Capacitors in pico farads
Inductors in milli henries, unless otherwise noted In this implementation, it will be seen that the filter characteristic 105 (FIG. 4) is provided at the low-frequency carrier 73g (FIG. 2C) by combining, in series, a band pass filter 181 and notch filter 183 the notch of the notch filter being placed at 5 KHz, 3 KHz below the carrier frequency 73g. In the remaining vestigial band pass filters 37f, 37h, and 59a (FIG. 1), the carrier frequency is high enough that it is possible to implement the band pass characteristic 105 (FIG. 4) by detuning the poles of the band pass filter 181 on the modified vestigial side band side of the band pass filter characteristic. This modification is provided by the circuit values in the table above, with the variable inductances being tuned for each of the modified vestigial channels to approximate, as closely as possible, the plot 105 of FIG. 4.

While an exemplary embodiment has been shown for the filters, it should be recognized that the invention linearities at certain frequencies, comprising:
plural transmitters at said central and remote stations, each generating on said transmission medium double side band AM modulated communication signals at different carrier frequencies; and
plural receivers at said central and remote stations, each tuned to one of said different carrier frequencies on said transmission medium, at least one of said plural receivers, which receiver is tuned to receive the double side band AM modulated communication signal from one of said plural transmitters, and which receiver is tuned to one of said certain frequencies which exhibit phase nonlinearities, attenuating at least a portion of one of said double side bands more than the corresponding portion of the other of said side bands to eliminate side band phase cancellation.

2. A transmission system, as defined in claim 1, wherein said transmission medium exhibits nonlinear phase characteristics at plural separated frequencies, and wherein plural of said receivers, which attenuate one of said double side bands more than the other of said double side bands, are utilized to receive different carrier frequencies at said plural separated frequencies.

3. A transmission system, as defined in claim 1, wherein at least one of said plural receivers receives full double side band AM modulated communication signals.

4. A transmission system, as defined in claim 1, wherein said one of said plural receivers provides substantially double side band reception at modulation frequencies below a first predetermined frequency, and substantially single side band reception at modulation frequencies above a second predetermined frequency.

5. A transmission system, as defined in claim 1, wherein said one of said plural receivers attenuates the received carrier frequency by approximately 3.5 db.

6. A transmission system, as defined in claim 1, wherein said one of said plural receivers additionally comprises:
filter means having an attenuation versus frequency slope characteristic at the received carrier frequency for reducing distortion caused by frequency drift of the carrier.

7. A transmission system, as defined in claim 1, wherein said one of said plural receivers includes a band pass filter, the pass band of which extends on both sides of the received carrier frequency, the poles on one side of the pass band having a relatively lower Q than the poles on the other side of the pass band.

8. A transmission system, as defined in claim 1, wherein said one of said plural receivers includes a band pass filter providing a pass band which extends above and below the received carrier frequency by a predetermined frequency amount, and a notch filter, the notch of which is frequency positioned adjacent one edge of said band pass filter.

9. A method of carrier multiplexing multiple telephone communication channels between a single central station and plural remote stations on a single communication medium exhibiting phase nonlinearities at a certain frequency, comprising:
transmitting said multiple channels from said central and remote stations on said communication medium as double side band AM modulated carrier signals having carriers at different frequencies; and
avoiding communication medium induced distortion at said certain frequency by receiving at least some modulation frequencies on said communication medium of at least one of said multiple double side band AM modulated channels at one of said central or remote stations as a single side band AM modulation signal.

10. A method of carrier multiplexing, as defined in claim 9, additionally comprising:
receiving another one of said multiple channels at one of said central or remote stations as a double side band AM modulation signal.

11. A method of carrier multiplexing, as defined in claim 10, wherein said one of said multiple channels is selected to receive a carrier frequency at which said single communication medium exhibits nonlinear phase characteristics.

12. A method of carrier multiplexing, as defined in claim 9, wherein said avoiding step comprises receiving said modulation frequencies in a manner which provides a non-flat pass band response to modulation frequencies.

13. A method of carrier multiplexing, as defined in claim 9, wherein said avoiding step avoids medium induced distortion, including that produced by repeaters, in said communication medium.

14. A method of carrier multiplexing, as defined in claim 9, wherein said transmitting step comprises transmitting said multiple channels as double side band AM modulated carrier signals which do not overlap within the frequency spectrum.

15. A receiver filtering method used with a carrier multiplexed, double side band transmission, comprising:
receiving a modulated carrier of said carrier multiplexed, double side band transmission from a transmission medium at a carrier frequency at which said medium exhibits phase nonlinearities;
attenuating a first side band of said carrier to a greater extent than a second side band of said carrier at frequencies displaced from said carrier by less than a first amount;
essentially eliminating said first side band of said carrier, in comparison with said second side band of said carrier, at frequencies displaced from said carrier by more than a second amount; and
using a filter having an attenuation versus frequency slope at said carrier low enough to be effective in avoiding frequency drift induced distortion.

16. A receiver filtering method, as defined in claim 15, additionally comprising:
attenuating said carrier by approximately 3.5 db.

17. A receiver filtering method, as defined in claim 15, additionally comprising:
generating a non-flat modulation frequency pass band.

18. A receiver filtering method, as defined in claim 17, additionally comprising:
demodulating said carrier multiplexed tranmission; and
post demodulation filtering said carrier multiplexed transmission to generate a flat modulation frequency pass band response.

19. A receiver filtering method, as defined in claim 15, wherein said first amount is approximately 1.5 kilohertz and wherein said second amount is aproximately 2 kilohertz.

20. A method of designing a carrier multiplexed, multiple channel transmission system, for use with a transmission medium having nonlinear phase characteristics at certain frequencies comprising:
selecting carrier frequencies for double side band AM transmission of each of said multiple channels;
determining the frequencies at which said transmission medium exhibits acute nonlinear phase characteristics;
designing first double side band AM receivers for frequencies at which said transmission medium does not exhibit acute nonlinear phease characteristics; and
designing second receivers which attenuate at least a portion of one side band more than the corresponding portion of the other side band for said frequencies at which said transmission medium exhibits acute nonlinear phase characteristics.

21. A method of designing a carrier multiplexed, multiple channel transmission system, as defined in claim 20, additionally comprising:
maintaining the attenuation slope of said receivers sufficiently gradual at the received carrier frequency to avoid frequency drift produced distortion.

22. A method of designing a carrier multiplexed, multiple channel transmission system, as defined in claim 20, wherein said second receivers designing step additionally comprises designing receivers having attenuation characteristics which provide essentially double side band reception below a first modulation frequency and essentially single side band reception above a second modulation frequency.

23. A method of designing a carrier multiplexed, multiple channel transmission system, as defined in claim 20, wherein said transmission medium includes a repeater having a repeater filter which has a filter cut-off point at a predetermined frequency, said second receiver designing step being utilized for receivers operating at frequencies adjacent said predetermined cut-off point frequency of said repeater filter.

24. A method of designing a carrier multiplexed, multiple channel transmission system, as defined in claim 20, wherein the multiple channels of said system are within a predetermined frequency band, and wherein said transmission medium includes cables having nonlinear phase characteristics at low transmission frequencies within said frequency band, said second receiver designing step being utilized at said low transmission frequencies.

25. A receiver filter used with a double side band, AM modulated carrier signal in a carrier multiplexed telephone transmission system used for communicating telephone signals between a single central office terminal and plural remote subscriber terminals on a single communication medium, said filter tuned to a communication frequency at which said medium exhibits phase nonlinearities, comprising:
means for providing a pass band frequency displaced on both sides of said carrier signal; and
means for attenuating said double side band, AM modulated carrier to a greater extent at frequencies within said pass band displaced in one direction from said carrier signal than at frequencies within said pass band displaced by an equal amount in the other direction from said carrier signal.

26. A receiver filter, as defined in claim 25, wherein said means for providing a pass band frequency comprises a band pass filter and wherein said means for attenuating comprises a notch filter.

27. A receiver filter, as defined in claim 26, wherein said carrier multiplexed transmission system operates in a prescribed frequency band, and wherein said receiver filter is used at low carrier frequencies within said prescribed frequency band of said carrier multiplexed transmission system.

28. A receiver filter, as defined in claim 25, wherein said means for providing a pass band frequency comprises a band pass filter and wherein said means for attenuating comprises poles of said band pass filter designed to have reduced Q.

29. A receiver filter, as defined in claim 28, wherein said carrier multiplexed transmission system includes repeaters having filter attenuation cut-off curves, said filters being used at frequencies adjacent said cut-off curves.

30. A receiver filter, as defined in claim 25, wherein said means for attenuating attenuates the received carrier frequency by approximately 3.5 db.

31. A receiver filter, as defined in claim 30, wherein said attenuating means further comprises means for maintaining the attenuation versus frequency slope at said received carrier frequency low enough to be effective in avoiding frequency drift generated distortion.

32. A receiver filter, as defined in claim 25, wherein said means for attenuating provides a non-flat modulation frequency pass band.

33. A receiver filter, as defined in claim 32, additionally comprising:
a post detection filter providing a non-flat modulation frequency pass band complementing the non-flat pass band of said attenuating means.

34. A carrier multiplexed telephone transmission system, comprising:
a pair of transmission lines;
plural central office channels, each comprising:
a transmitter for generating on said pair of transmission lines a double side band AM modulated carrier output signal carrying voice information; and
a receiver for receiving AM modulated carrier signals from said pair of transmission lines to demodulate voice information; plural subscriber channels, each comprising:
a transmitter for generating through said pair of transmission lines a double side band AM modulated carrier output signal carrying voice information; and
a receiver for receiving AM modulated carrier signals from said pair of transmission lines to demodulate voice information; at least one of said central office and
subscriber channel receivers demodulating both the upper and lower side bands of said AM modulated carrier; and
at least one other of said central office and subscriber channel receivers, which is tuned to a frequency at which said transmission lines exhibit phase nonlinearities, demodulating one side band to the substantial exclusion of the other side band of said AM modulated carrier at selected modulation frequencies.

35. A carrier multiplexed telephone transmission system, as defined in claim 34, wherein said selected modulation frequencies are frequencies above a predetermined modulation frequency.

36. A carrier multiplexed telephone transmission system, as defined in claim 34, additionally comprising:
a repeater amplifier connected in series with said pair of transmission lines, said repeater amplifier including a filter having a filter attenuation curve at a selected transmission frequency.

37. A carrier multiplexed telephone transmission system, as defined in claim 36, wherein said at least one other of said central office and subscriber channel receivers receives an AM modulated carrier signal adjacent said repeater filter curve.

38. A carrier multiplexed telephone transmission system, as defined in claim 34, wherein said at least one other of said central office and subscriber channel receivers receives a modulated carrier signal at a frequency at which said pair of transmission lines exhibits nonlinear phase characteristics.

39. A carrier multiplexed telephone transmission system, as defined in claim 34, wherein said at least one other of said central office and subscriber channel receivers includes a band pass and notch filter connected in series.

40. A carrier multiplexed telephone transmission system, as defined in claim 34, wherein said at least one other of said central office and subscriber channel receivers includes a pass band filter with selected filter poles offset to provide non-flat pass band response.

41. A telephone transmission system providing multiple modulated carrier communication channels between a single central station and plural remote stations on a single transmission medium, comprising:

a transmitter for modulating a carrier signal to provide one of said communication channels;

a receiver for demodulating said one of said communication channels;

a filter in said communication channel providing a pass band which:
(a) provides substantially double side band communication on said channel at modulation frequencies below a first predetermined frequency;
(b) provides substantially single side band communication on said channel at modulation frequencies above a second predetermined frequency;
(c) provides approximately 3.5 db attenuation of said carrier signal with respect to the least attenuated modulation frequencies.

* * * * *